(12) United States Patent
Fishman et al.

(10) Patent No.: US 7,251,417 B2
(45) Date of Patent: Jul. 31, 2007

(54) METHOD AND APPARATUS FOR OPTIMIZATION OF DISPERSION-MANAGED RETURN-TO-ZERO TRANSMISSION BY EMPLOYING OPTICAL PULSES HAVING VARIABLE WIDTHS

(75) Inventors: Daniel A. Fishman, Lakewood, NJ (US); Yuan-Hua Kao, Holmdel, NJ (US); Taras Igorevich Lakoba, Morganville, NJ (US); Frank J. Peragine, Fair Haven, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 497 days.

(21) Appl. No.: 10/094,515

(22) Filed: Mar. 8, 2002

(65) Prior Publication Data

US 2004/0208648 A1 Oct. 21, 2004

(51) Int. Cl.
*H04B 10/04* (2006.01)
(52) U.S. Cl. ........................ 398/189; 398/192; 398/198
(58) Field of Classification Search ................ 398/29, 398/80–81, 94, 141, 147–150, 159, 178, 398/183, 185, 192, 193, 197, 198, 208, 214, 398/200, 189; 385/123
See application file for complete search history.

(56) References Cited

U.S. PATENT DOCUMENTS

| | | | |
|---|---|---|---|
| 5,373,382 A * | 12/1994 | Pirio et al. ................... 398/185 |
| 5,559,920 A | 9/1996 | Chraplyvy et al. ......... 385/123 |
| 5,781,673 A | 7/1998 | Reed et al. .................... 385/24 |
| 6,233,387 B1 * | 5/2001 | Berkey et al. .............. 385/123 |
| 6,243,181 B1 | 6/2001 | Golovchenko et al. ..... 359/161 |
| 6,321,015 B1 | 11/2001 | Doran et al. ................ 385/123 |
| 6,324,317 B1 | 11/2001 | Tanaka et al. ................ 385/24 |
| 6,330,381 B1 | 12/2001 | Lu et al. ........................ 385/24 |
| 6,339,665 B1 | 1/2002 | Danziger .................... 385/123 |
| 6,542,280 B2 * | 4/2003 | Walklin ...................... 359/276 |
| 6,671,079 B2 * | 12/2003 | Fuller et al. ................. 359/264 |
| 6,731,877 B1 * | 5/2004 | Cao .............................. 398/91 |
| 6,744,988 B2 * | 6/2004 | Leclerc et al. .............. 398/102 |
| 6,744,992 B2 * | 6/2004 | Bergano ..................... 398/183 |
| 6,836,622 B2 * | 12/2004 | Kobayashi et al. ......... 398/198 |
| 2001/0053165 A1 * | 12/2001 | Wang et al. .............. 372/38.02 |
| 2002/0080477 A1 * | 6/2002 | Suzuki ....................... 359/385 |
| 2002/0118424 A1 * | 8/2002 | Miki et al. .................. 359/187 |
| 2003/0058508 A1 * | 3/2003 | Webb et al. ................ 359/181 |
| 2005/0002675 A1 * | 1/2005 | Sardesai et al. ............ 398/183 |

OTHER PUBLICATIONS

"Soliton Collisions in Wavelength-Division-Multiplexed Dispersion-Managed Systems", P. V. Mamyshev and L. F. Mollenauer, Optics Letters, vol. 24, No. 7, Apr. 1, 1999, pp. 448-450.
"Optimization of the Average-Dispersion Range for Long-Haul Dispersion-Managed Soliton Systems", T. I. Lakoba and G. P. Agrawal, Journal of Lightwave Technology, vol. 18, No. 11, Nov. 2000, pp. 1504-1512.

* cited by examiner

*Primary Examiner*—Dzung Tran

(57) ABSTRACT

A method and apparatus for transmitting optical pulses in a dispersion-managed optical transmission system comprises determining the pulse width of optical pulses in a optical transmission channel in accordance with the path-average dispersion (PAD) experienced by that channel.

19 Claims, 8 Drawing Sheets

100

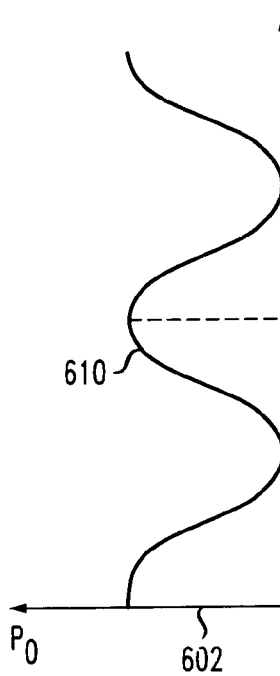
*FIG. 6A*
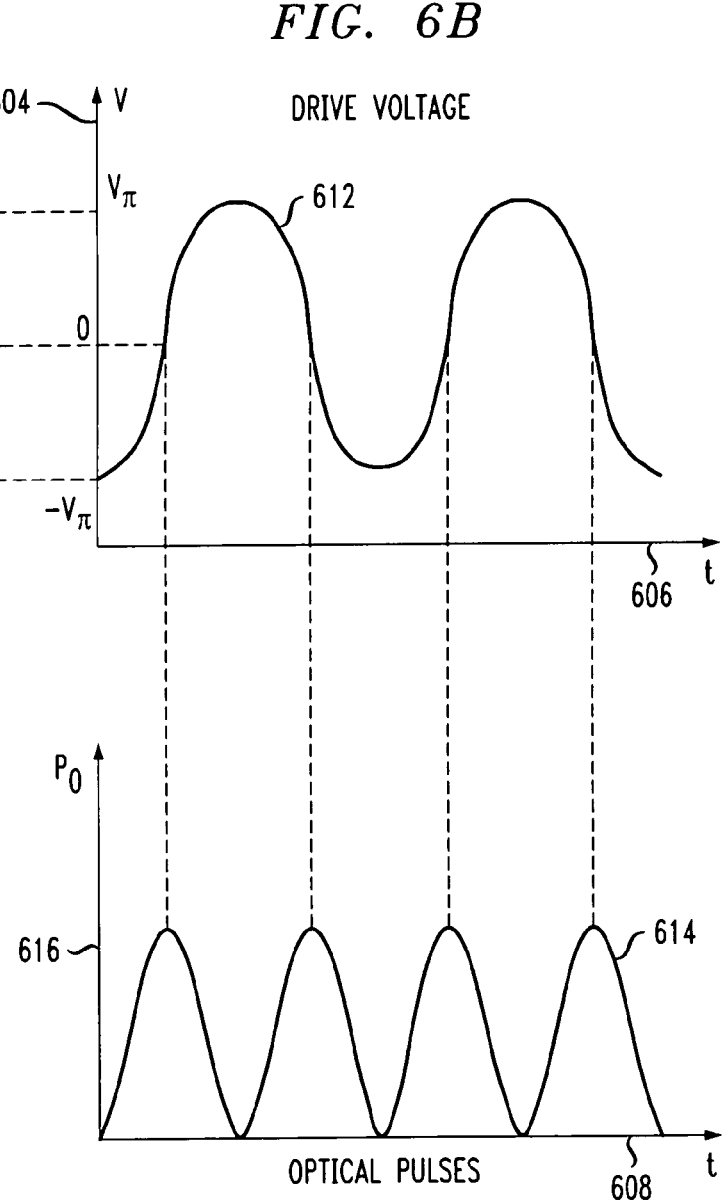

US 7,251,417 B2

METHOD AND APPARATUS FOR OPTIMIZATION OF DISPERSION-MANAGED RETURN-TO-ZERO TRANSMISSION BY EMPLOYING OPTICAL PULSES HAVING VARIABLE WIDTHS

BACKGROUND OF THE INVENTION

1. Field of the Invention

The present invention generally relates to lightwave communications systems and, more particularly, to a method and apparatus for transmitting optical pulses having variable pulse widths.

2. Description of the Related Art

In the field of fiber optic communications, it has been known for some time to increase the capacity of an optical communications link by propagating wavelength-division multiplexed (WDM) optical signals along optical fibers. Specifically, a WDM signal is composed of a plurality of distinct wavelengths of light, each such wavelength carrying a respective optical information signal, also known as an information channel. The number of wavelengths (i.e., information channels) in a WDM signal is a system parameter and usually ranges from 2 to over 100 (in the case of "dense" WDM, or DWDM).

Chromatic dispersion can be a limiting factor in such optical transmission systems. Chromatic dispersion is the tendency of a pulse of light propagating through an optical fiber to broaden due to the phenomenon that different wavelengths of light pass through the fiber at different speeds. While such dispersion is useful for suppressing non-linear effects, such as four-wave mixing and self-phase modulation, too much dispersion easily causes intersymbol interference. Normally, dispersion in the transmission fiber is reduced by periodic use of a dispersion compensation device in the various network elements of the optical transmission system. However, a single dispersion compensation device in each network element typically cannot provide the same average dispersion for all optical signals of a WDM transmission system (i.e., the extent of average dispersion for optical signals having different wavelengths varies). This may force a designer of optical transmission systems to employ multiple dispersion compensation devices, both inline, and at the end terminal. The use of multiple dispersion compensation devices results in increased system complexity and additional cost.

SUMMARY OF THE INVENTION

The disadvantages associated with the prior art are overcome by a method and apparatus for transmitting optical pulses having variable pulse widths. Specifically, the present invention adjusts the pulse width of optical pulses propagating in each of a plurality of optical channels in an optical transmission line, in response to the path-average dispersion (PAD) of the respective optical channel. In one embodiment, the lightwave communication system employs an optical transmission line having a PAD as a function of wavelength that is a parabola. As such, the present invention optimizes the system performance by adjusting the pulse width of each of the optical pulses in a given optical channel in response to the PAD experienced by that optical channel. In this embodiment, the pulse width of the optical pulses is set to a first value when the PAD is in a first range corresponding to shorter and longer wavelength optical channels, and the pulse width of the optical pulses is set to a second value when the PAD is in a second range corresponding to middle wavelength optical channels.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 6A through 6C graphically illustrate the relation between the RF driving voltage, the transfer function of an optical modulator, and the optical pulse stream generated by the optical modulator;

DETAILED DESCRIPTION OF THE PREFERRED EMBODIMENT

The present invention will be described within the context of a lightwave transmission system that advantageously improves dispersion compensation by transmitting optical pulses having variable pulse widths. In one embodiment, the pulse width of each optical pulse is determined in accordance with its wavelength thereby mitigating the performance degradation due to the variability of the path-average dispersion versus wavelength in an optical transmission line. Although the principles of the present invention are particularly applicable to ultra-long haul applications (e.g., dispersion-managed soliton applications) and shall be described in this context, those skilled in the art will appreciate that the invention may find broad applications in other contexts.

Figure 1:
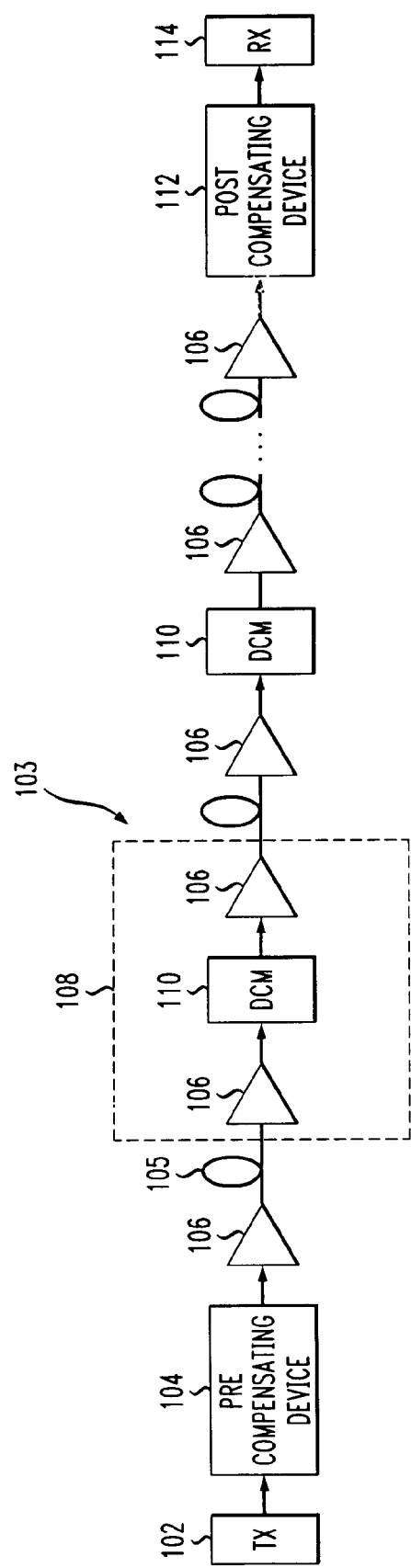
FIG. 1 depicts a block diagram of an illustrative lightwave communication system embodying the principles of the present invention.

FIG. 1 depicts a block diagram of an illustrative lightwave communication system 100 embodying the principles of the present invention. The system comprises an optical transmitter 102, an optical transmission line 103, and an optical receiver 114. The optical transmitter 102 converts an electrical data signal to an optical data signal for transmission over the optical transmission line 103 to the optical receiver 114. The optical receiver 114 reconverts the optical data signal to an electrical signal. A plurality of optical amplifiers 106 within the optical transmission line 103 amplify the optical data signal provided by the optical transmitter 102 to ensure that sufficient signal is received at the input of the optical receiver 114. The output of the optical transmitter 102 is coupled to a pre-compensation device 104 for introducing a predetermined amount of dispersion to the optical data signal prior to transmission via the optical transmission line 103. Likewise, the optical data signal provided by the optical transmission line 103 is coupled to a post-compensation device 112 at the receiver 114 to compensate for dispersion introduced by the optical transmission line 103. Both the pre- and post-compensation devices 104 and 112 can comprise a length of dispersion compensating fiber (DCF), a dispersion compensation grating (DCG), or any other dispersion compensation device known in the art.

In the present example, the optical transmission line 103 includes various network elements, such as multiple stages of repeaters 108. In general, optical transmission line 103 could be any type of simple or complex arrangement of components, such as repeaters, optical add/drop multiplexers, optical cross-connects, or any other element that supplies or propagates optical signals along an optical transmission path. The repeaters 108 are separated by optical fiber spans 105. Each fiber span 105 comprises a length of optical transmission medium, such as TRUEWAVE® optical fiber or LEAF® optical fiber. Fiber spans 105 may be on the order of 40-120 km in length for long-haul networks, or may be any other suitable length for use in short and medium distance lightwave communication systems.

As shown, each repeater 108 comprises a dispersion compensation module (DCM) 110 serially coupled between optical amplifiers 106. Optical amplifiers 106 can comprise semiconductor optical amplifiers, rare-earth doped optical amplifiers, such as erbium doped fiber amplifiers (EDFAs), Raman amplifiers, or any other suitable optical amplifiers known to those skilled in the art. DCMs 110 can comprise a length of dispersion compensating fiber (DCF), a dispersion compensation grating (DCG), or any other dispersion compensation device known in the art. DCMs 110 compensate for dispersion introduced to the optical data signal due to transmission through respective optical fiber spans 105. Although the present invention is described with respect to a DCM serially coupled between optical amplifiers, other known arrangements of optical amplifiers and/or other well-known optical components can also be used without departing from the spirit and scope of the present invention.

In operation, the optical data signal provided by optical transmitter 102 comprises an optical pulse stream modulated in accordance with data to be transmitted. The optical pulses are return-to-zero (RZ) optical pulses where the maximum pulse width does not exceed the bit period. That is, optical pulses in adjacent bit slots do not overlap significantly at any point in the optical transmission line 103 (such pulses are also referred to as dispersion-managed solitons). In addition, the optical data signal typically comprises a plurality of wavelengths of light, each wavelength providing a different optical communication channel. For example, the lightwave communication system 100 supports many optical channels, illustratively more than 100 channels, each using a different optical carrier wavelength. Optical channels can be modulated at, for example, 10 Gbps. The carrier wavelengths are illustratively in the vicinity of 1500 to 1625 nm. These are merely illustrative system characteristics. If desired, more channels can be provided, signals may be modulated faster, and a wider range of carrier wavelengths can be supported.

Figure 9:
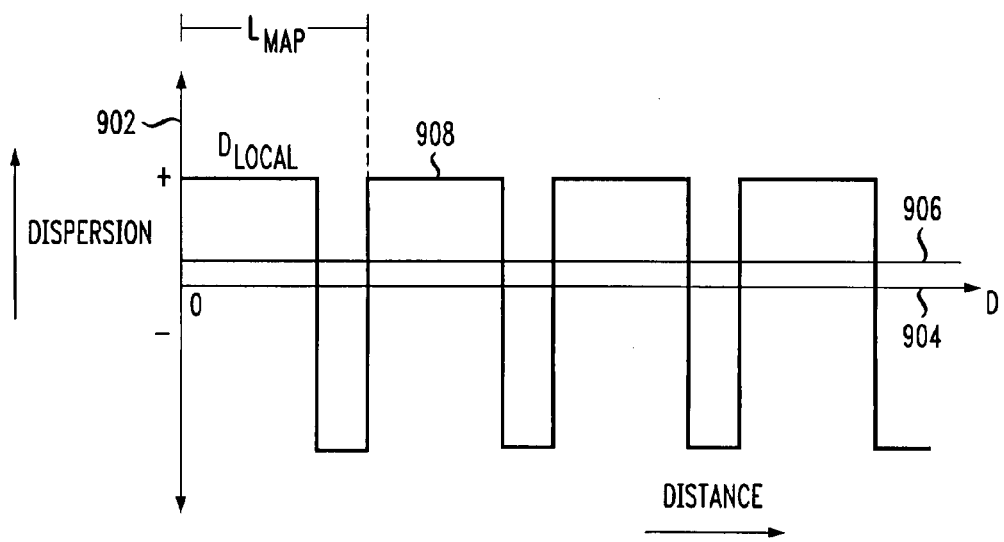
FIG. 9 graphically illustrates an exemplary dispersion map for a given optical channel in the lightwave communication system of FIG. 1.

The dispersion provided by fiber spans 105 and DCMs 110 repeats periodically throughout the optical transmission line 103. This periodic dispersion is known as the dispersion map. FIG. 9 shows an exemplary dispersion map 908 for a given optical channel in the lightwave communication system 100. Axis 902 represents the dispersion and axis 904 represents distance. As shown, $L_{MAP}$ is the period of the dispersion map 908. Each period comprises a positive dispersion $D_{Local}$ and a negative dispersion $D_{DCM}$. That is, the optical pulses of the optical data signal will broaden while traveling along a fiber span 105 between two network elements. The respective DCM 110 has a negative dispersion such that the positive dispersion of the optical pulses traveling in the fiber span 105 will be balanced to provide a near-zero path average dispersion (PAD). $D_{Local}$ is preferably large enough to thoroughly suppress non-linear effects, such as four-wave mixing, but small enough to avoid adjacent-pulse interaction. Line 906 represents the PAD of the dispersion map 908. The PAD 906 is preferably constant over the entire transmission line 103.

Figure 2:
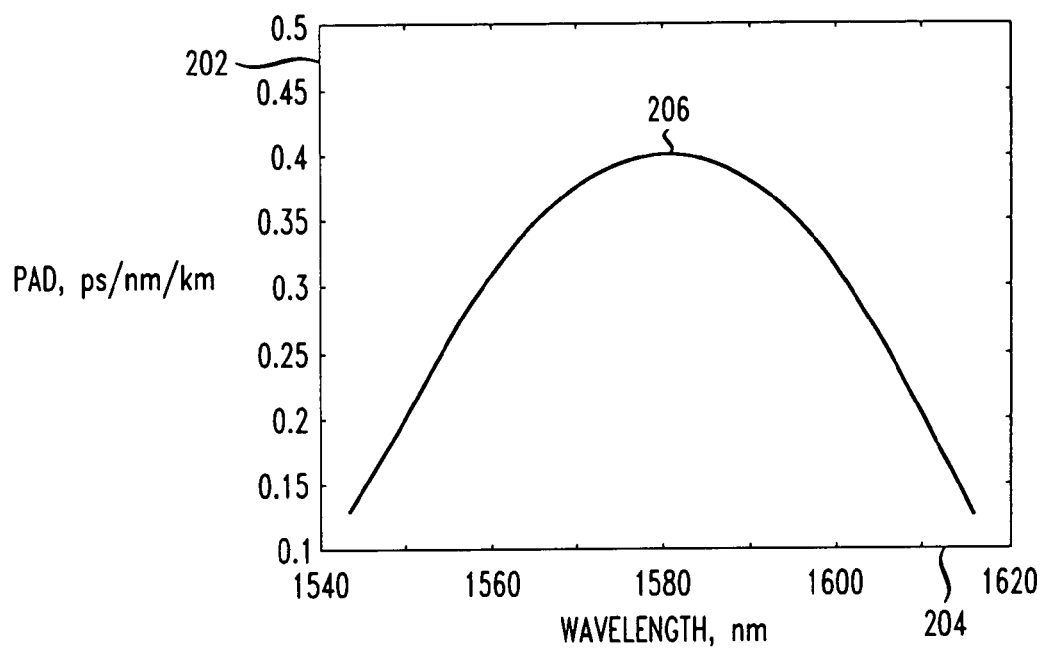
FIG. 2 illustrates a typical path-average dispersion (PAD) curve versus wavelength for the lightwave communication system of FIG. 1.

In addition to dispersion, each fiber span 105 has a dispersion slope that causes the dispersion to vary with the wavelength of light traveling therethrough. For example, both TRUEWAVE® and LEAF® optical fibers have dispersion that varies linearly with the transmitted wavelength. Each DCM 110 also exhibits a dispersion slope of the opposite sign and, in addition, has a non-negligible-dispersion curvature. As a result, the PAD of a transmission line 103 as a function of the transmitted wavelength is a parabola or higher-order polynomial curve. FIG. 2 illustrates a typical PAD curve 206 versus wavelength. As shown, axis 202 represents PAD in units of ps/nm/km, and axis 204 represents wavelength. In the present example, shorter wavelengths (e.g., 1540-1560 nm) experience low values of PAD (e.g., 0.10-0.20 ps/nm/km); middle wavelengths (e.g., 1570-1590 nm) experience high values of PAD (e.g., 0.35-0.40 ps/nm/km); and longer wavelengths (e.g., 1610-1620 nm) experience low values of PAD (e.g., 0.10-0.20 ps/nm/km).

In accordance with the present invention, the optical pulse width used by a particular optical channel is varied depending on the PAD experienced by that channel. That is, the optical pulse width is varied in accordance with the wavelength of the optical channel. By varying the pulse width, the present invention advantageously allows for the use of a single DCM 110 in each repeater 108, and a single post-compensation device 114 at the receiver 114, to compensate for dispersion in the optical data signal over the entire wavelength band.

More specifically, parameters of lightwave communication system 100, such as temporal width, spectral width, and peak power of optical pulses in the optical data signal, approximately repeat themselves at the beginning of each period of the dispersion map. This is necessary to guarantee a balance between self-phase modulation and residual dispersion in each period. The balance condition has the following form:

$$\overline{D} = <P> f(T_p) \qquad \text{Eq. 1}$$

where $\overline{D}$ is the PAD, $<P>$ is the channel time-average power (i.e., the pulse energy divided by the bit duration), and $f(T_p)$ is a certain function of the pulse width $T_p$ (measured at the chirp-free point inside the dispersion map) such that $df/dT_p>0$ (i.e., the function $f(T_p)$ is increasing with greater values of $T_p$). See, for example, Lakoba and Agrawal, "Optimization of the Average-Dispersion Range for Long-Haul Dispersion-Managed Soliton Systems", Journal of Lightwave Tech., pp. 1504-1512, Vol. 18, No. 11, November 2000, which is herein incorporated by reference in its entirety.

As described above with respect to FIG. 2, the value of $\overline{D}$ (PAD) usually varies by a factor of two across the C- or L-band. The power <P> is determined by the requirement to have a particular signal-to-noise ratio (SNR) at the receiver 114. It is not always possible, or advisable, to profile <P> to mimic the behavior of $\overline{D}$ versus wavelength. In fact, <P> is preferably kept the same for all optical channels in the optical data signal. Thus, the inventors note that the balance condition of equation 1 cannot be satisfied over the entire wavelength band of transmission if the optical pulses in all the optical channels have the same pulse width $T_p$.

The present invention advantageously varies the pulse width of the optical pulses such that the balance condition of equation 1 is maintained over the entire wavelength band of operation. That is, given an optical channel having a particular PAD, optical pulses are used that have a pulse width such that the balance condition of equation 1 is maintained. In one embodiment, optical channels that experience higher values of PAD use wider optical pulses and optical channels that experience lower values of PAD use nominal optical pulses (e.g., 33 ps). It should be noted that the pulse width has an upper bound, since pulses in adjacent bit slots interact strongly with each other as the pulse width is increased due to a larger overlap of their "tails". This adjacent pulse interaction leads to enhanced timing and amplitude jitter.

Therefore, in a lightwave transmission system characterized by a given transmission distance, fiber type(s), and signal power, there is a specific range of pulse width values where transmission performance is optimal. For example, consider a lightwave transmission system comprising 40 fiber spans of 100-km TRUEWAVE® reduced slope (TWRS) optical fiber or LEAF® optical fiber (e.g., a 4000 km transmission line). In this example, optical channels having a PAD of approximately 0.1 ps/nm/km (e.g., shorter and longer wavelengths) favor 33 ps pulses, while optical channels having a PAD of approximately 0.4 ps/nm/km (e.g. middle wavelengths) favor 45 ps pulses. In general, the present invention employs nominal width optical pulses when the PAD is in a first range, and 30-60% larger output pulses than nominal when the PAD is in a second range.

Figure 3:
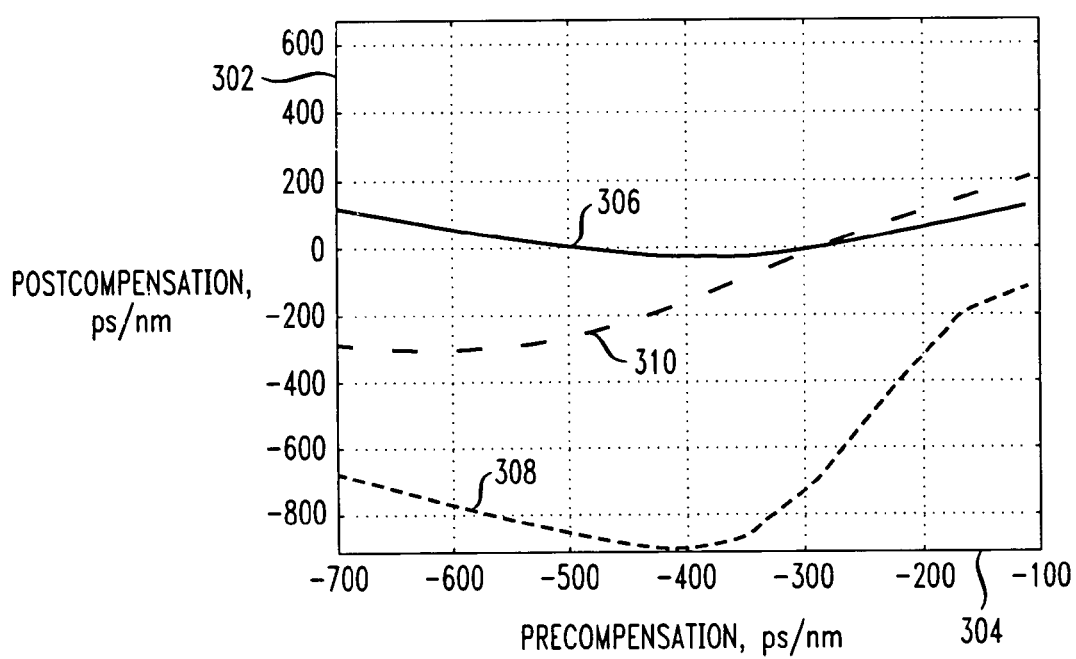
FIG. 3 illustrates post-compensation adapted to obtain chirp-free optical pulses at a receiver in the lightwave communication system of FIG. 1 for optical pulses experience differing values of PAD and having differing pulse widths.

As described above, this allows a single DCM 110 to be used in each repeater 108, and a single post-compensation device 112 to be used at the receiver 114. FIG. 3 illustrates the post-compensation required to obtain chirp-free optical pulses at the receiver 114, where the transmission line 103 comprises 40 fiber spans of 100-km TRUEWAVE® reduced slope (TWRS) optical fiber. As shown, axis 302 represents the post-compensation dispersion in ps/nm, and axis 304 represents the pre-compensation dispersion in ps/nm. Curve 306 corresponds to a PAD of 0.1 ps/nm/km (e.g., shorter and longer wavelengths) and an optical pulse width of 33 ps. Curve 308 corresponds to a PAD of 0.4 ps/nm/km (e.g., middle wavelengths) and an optical pulse width of 33 ps. Curve 310 corresponds to a PAD of 0.4 ps/nm/km and an optical pulse width of 44 ps. Clearly, if optical pulses of the same pulse width (33 ps) are used for all wavelengths, then a single post-compensation device 112 cannot be used to correctly compensate for dispersion in the optical transmission fiber 103 for any amount of pre-compensation. If, however, optical channels experiencing the higher PAD of 0.4 ps/nm/km use optical pulses having a 44 ps pulse width, then a single post-compensation device 114 can be used given a particular value of pre-compensation (e.g., approximately −300 ps/nm in the present example, where curves 306 and 310 intersect).

Figure 4A:
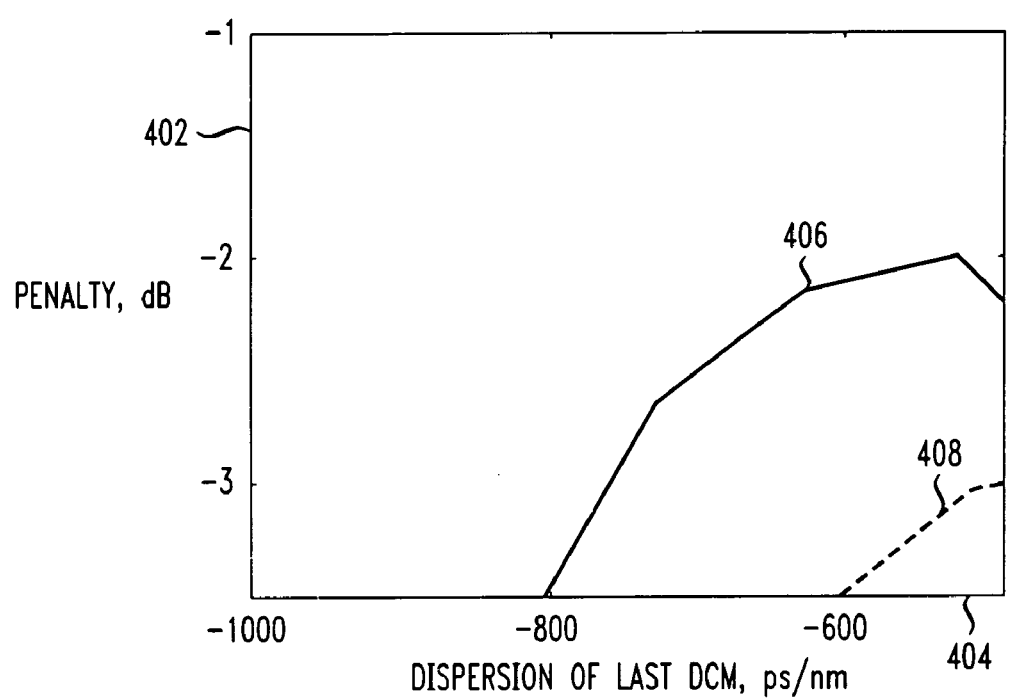
FIGS. 4A through 4C graphically illustrate exemplary eye-closure penalties for optical pulses experience differing values of PAD and having differing pulse widths.
Figure 4B:
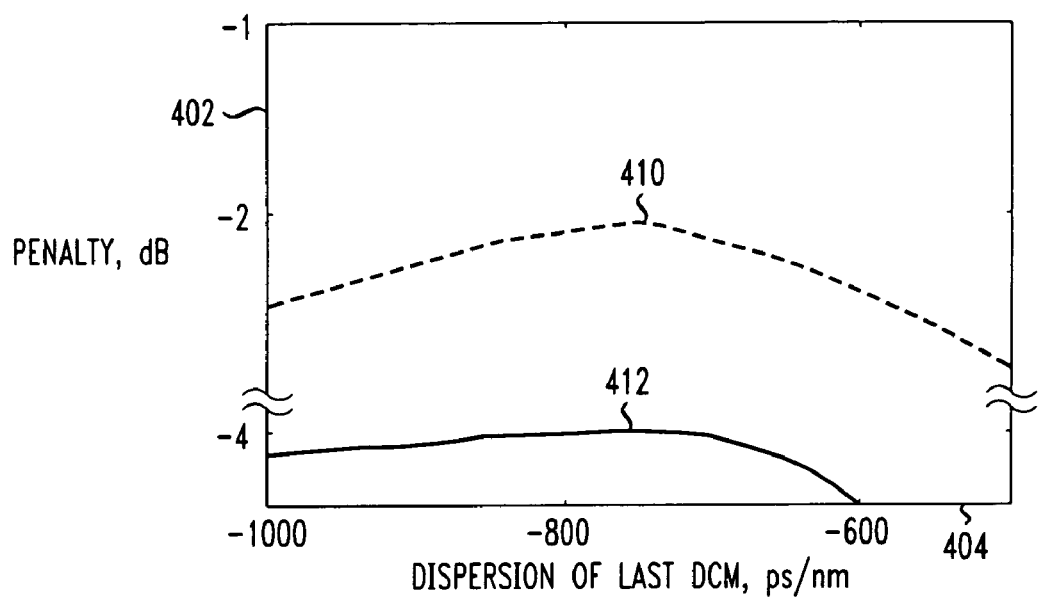
Figure 4C:
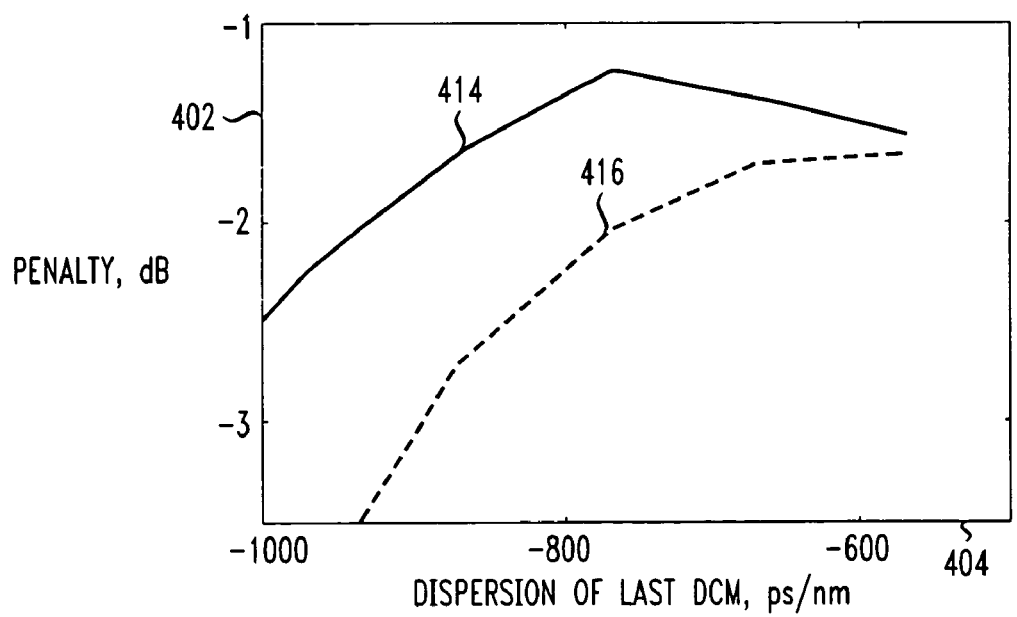

FIGS. 4A through 4C graphically depict exemplary eye-closure penalties incurred in transmission over 40 spans of 100-km TRUEWAVE® reduced slope (TWRS) optical fiber. Again, the PAD curve for this system is a parabola illustrated in FIG. 2, with a PAD of 0.1 ps/nm/km at the shortest and longest wavelengths, and a PAD of 0.4 ps/nm/km at the middle wavelengths. FIGS. 4A through 4C share common axes in that axis 402 represents the eye-opening in dB and axis 404 represents the dispersion of the optical data signal after the last DCM 110 in ps/nm. Specifically, FIG. 4A shows the eye-closure penalty for shorter wavelengths (PAD of 0.1 ps/nm/km), FIG. 4B shows the eye-closure penalty for middle wavelengths (PAD of 0.4 ps/nm/km), and FIG. 4C shows the eye-closure penalty for longer wavelengths (PAD of 0.1 ps/nm/km).

As shown in FIG. 4A (low PAD), curve 406 represents the eye-opening of optical pulses having a pulse width of 33 ps. Curve 408 represents the eye-opening of optical pulses having a pulse width of 44 ps. Clearly, the optical pulses having a 33 ps pulse width perform better than optical pulses having a 44 ps pulse width for any value of prior dispersion compensation. As shown in FIG. 4B (high PAD), curve 410 represents the eye-opening of optical pulses having a pulse width of 44 ps, and curve 412 represents the eye-opening of optical pulses having a pulse width of 33 ps. In the case of higher PAD, optical pulses having a pulse width of 44 ps perform better than optical pulses having a 33 ps pulse width for any value of prior dispersion compensation. Finally, as shown in FIG. 4C (low PAD and longer wavelengths), curve 414 represents the eye-opening of optical pulses having a pulse width of 33 ps, and curve 416 represents the eye-opening of optical pulses having a pulse width of 44 ps. As with the shorter wavelengths, the optical pulses having a 33 ps pulse width perform better than optical pulses having a 44 ps pulse width for any value of prior dispersion compensation.

Figure 5:
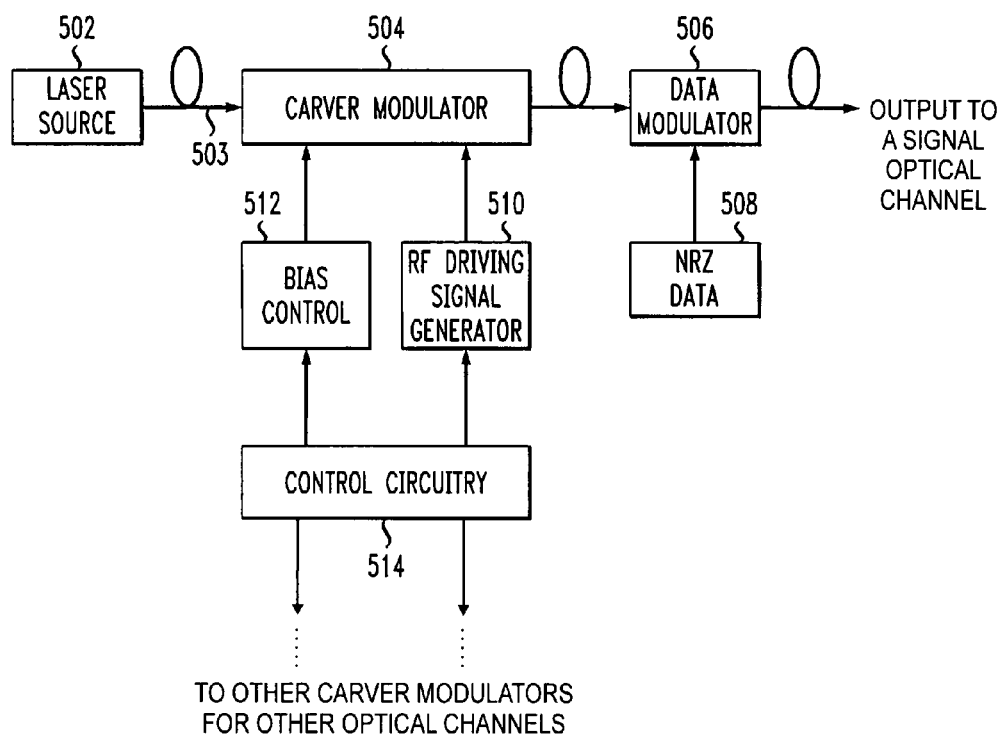
FIG. 5 depicts a block diagram of an exemplary optical transmitter for one optical channel that can be used with the present invention.

FIG. 5 depicts a block diagram of an exemplary optical transmitter 102 for one optical channel that can be used with the present invention. In the present embodiment, optical transmitter 102 comprises a laser source 502, a carver modulator 504, a data modulator 506, a non-return-to-zero (NRZ) data source 508, an RF driving signal generator 510, a bias control circuit 512, and control circuitry 514. The laser source 502 operates in a continuous wave (CW) mode to produce light at a predetermined transmission wavelength for a particular optical channel. Light from the laser source 502 is coupled to the carver modulator 504 via optical fiber 503. The carver modulator 504 is an optical modulator of the type that has a nonlinear and periodic transfer function (i.e, the optical power output varies periodically with increasing input voltage). Specifically, the transfer function has a minimum optical output at a first voltage driving level, a minimum optical output at a second voltage driving level, and a peak optical output at a voltage level between the first and second voltage driving levels. An interferometer, such as a Mach-Zehnder interferometer (MZI), for example, is appropriate for use with the present invention. An exemplary transfer function for a Mach-Zehnder modulator (MZM) is shown in FIG. 6A.

The RF driving signal generator 510 provides an RF driving signal to the carver modulator 504. The bias control circuit 512 provides the DC bias to the carver modulator 504. Control circuitry 514 controls the particular DC bias and RF driving signal generated by the bias control circuitry 512 and RF driving signal generator 510, respectively. Once properly biased and driven, the carver modulator 504 produces an optical pulse stream (i.e., an RZ optical signal) having a pulse frequency in accordance with the bit rate of the system (e.g., 10 Gbit/s or twice the frequency of the RF driving signal). The optical pulse stream generated by the carver modulator 504 is coupled to the data modulator 506. The data modulator 506 is an optical modulator, such as a Mach-Zehnder modulator, that modulates the optical pulse stream with an electrical NRZ data signal that represents the data to be transmitted. That is, the data modulator 506 acts like a switch to turn on or off specific ones of the optical pulses in the optical pulse stream in accordance with the bit stream of the electrical data signal. The electrical NRZ data signal is generated by NRZ data source 508.

The operation of the optical transmitter 102 with respect to the present invention is best understood with reference to FIGS. 6A through 6C. FIGS. 6A through 6C graphically depict the relation between the RF driving voltage, the transfer function of the carver modulator 504, and the optical pulse stream generated by the carver modulator 504 for optical pulses having a 33 ps pulse width. Specifically, FIG. 6A depicts the sinusoidal transfer function 610 of the carver modulator 504, where horizontal axis 602 represents optical power output (in watts) and vertical axis 604 represents voltage input of the RF driving signal. In the example shown, the transfer function has a first minimum at a voltage $-V_\pi$, a second minimum at a voltage $V_\pi$, and a maximum between $-V_\pi$ and $V_\pi$ at 0 V. The voltage $V_\pi$ is known as the half-wave voltage of an MZM and is defined as the bias voltage difference between the minimum and maximum output signal power of transmission. Since the transfer function is periodic, the voltage levels $-V_\pi$, 0, and $V_\pi$ are exemplary.

FIG. 6B graphically illustrates an RF driving signal 612, where horizontal axis 606 represents time and vertical axis 604 is common to that of FIG. 6A. When the carver modulator 504 is optimally biased, the zeros of the RF driving signal 612 occur at the maximum optical output along the transfer function 610. The RF driving signal 612 oscillates between $-V_\pi$ and $V_\pi$ (i.e., the RF driving signal 612 has a peak-to-peak voltage of $2V_\pi$). The control circuitry 514 is used to precisely set the level of the RF driving signal 612.

FIG. 6C graphically illustrates an optical pulse stream 614 that is generated at the output of the carver modulator 504, where vertical axis 616 represents optical power and horizontal axis 608 is common to that of FIG. 6B. The optical pulse stream 614 has an optical pulse frequency of twice the frequency of the RF driving signal 612, and a pulse width of 33 ps. As described above, such optical pulses are transmitted for optical channels having shorter and longer wavelengths corresponding to smaller values of PAD.

In accordance with one embodiment of the present invention, the pulse width of optical pulses 614 can be set to the desired value by varying the peak-to-peak amplitude of the RF driving signal 612. The output of the carver modulator 504 can be written as follows:

$$P_{carver} = P_0 \cos^2\left(\cos^{-1}\left(\frac{1}{\sqrt{XR}}\right)\cos(\omega_{RF}t)\right) \quad \text{Eq. 2}$$

where $P_{carver}$ is the output of the carver modulator 504, $P_0$ is the peak power, XR is the contrast ratio (i.e., the ratio between maximum and minimum power levels) of the carver modulator 504, and $\omega_{RF}$ is the angular frequency of the RF driving signal such that $\omega_{RF}/2\pi$ equals half the bit-rate. Clearly, $\cos^{-1}(1/\sqrt{XR})$ is the amplitude of the RF driving signal 612, and by varying it, the width of the output pulses 614 is also varied.

As described above, the amplitude of the RF driving signal is controlled by control circuitry 514. Control circuitry 514 can comprise a processor, a memory, an input/output circuit, and like type standard control components known in the art. In one embodiment, control circuitry 514 contains software that, when executed, causes the control circuitry 514 to perform the method of the present invention as described above.

Figure 7:
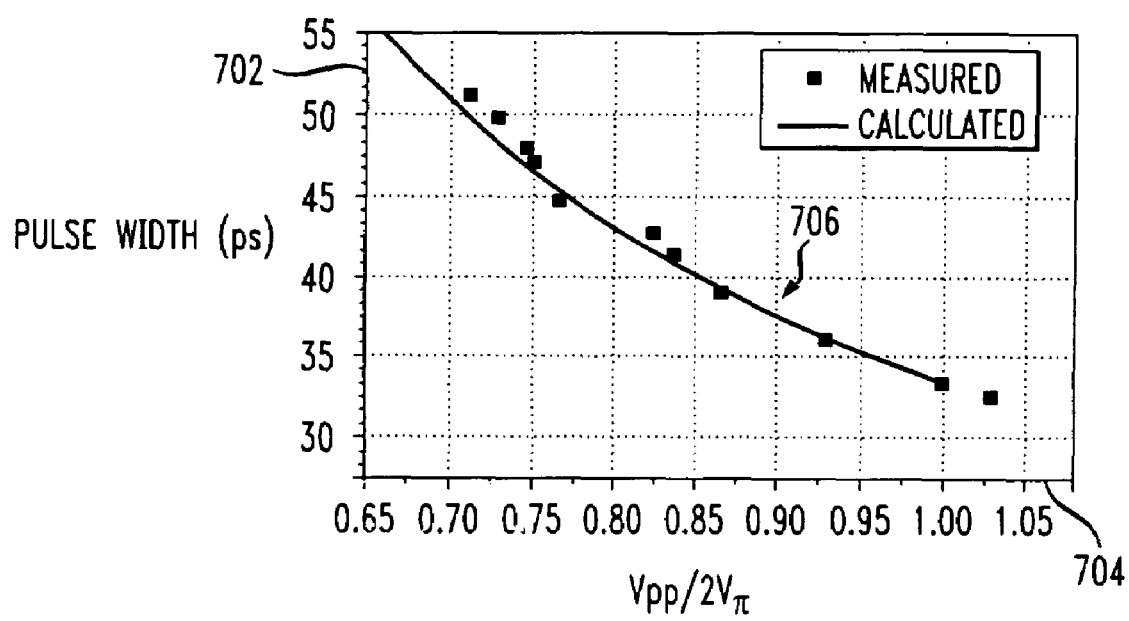
FIG. 7 graphically illustrates the dependence of the resultant pulse width on the amplitude of the RF driving voltage.

FIG. 7 graphically illustrates the dependence of the resultant pulse width on the amplitude of the RF driving voltage 612. As shown, axis 702 represents the pulse width in ps, and axis 704 represents the ratio of peak-to-peak RF driving voltage ($V_{pp}$) to twice $V_\pi$. Curve 706 represents the dependence of pulse width on RF driving voltage. For example, if a pulse width of 44 ps is desired (i.e., transmitting using the middle wavelengths as shown in FIG. 2), then the peak-to-peak amplitude of the RF driving voltage should be approximately 80% of twice $V_\pi$.

Figure 8:
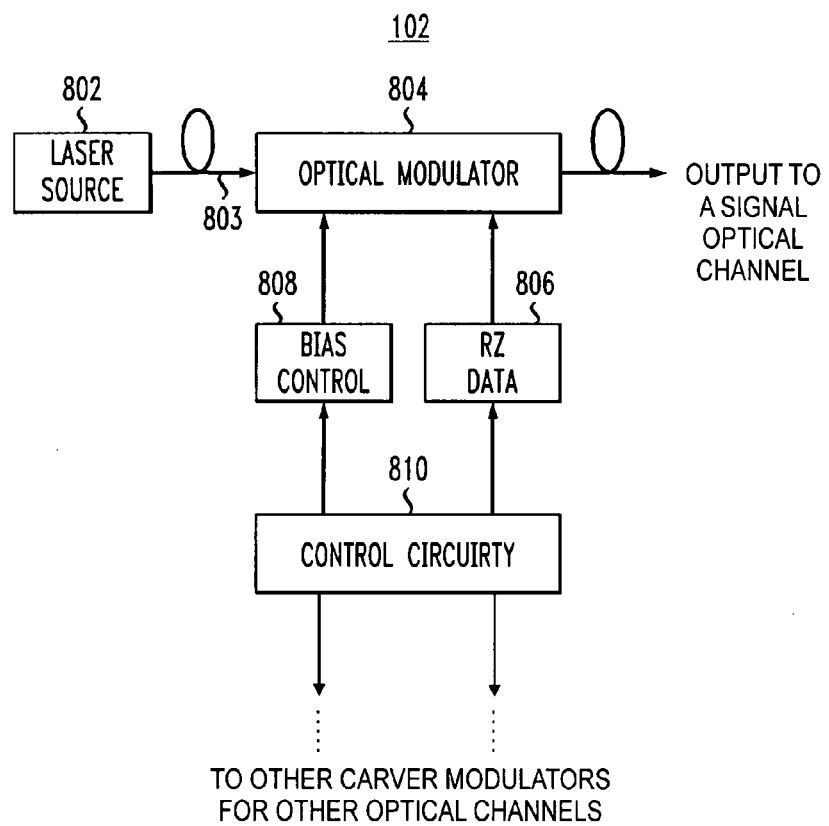
FIG. 8 depicts a block diagram of another embodiment of an optical transmitter for one optical channel that can be used with the present invention.

FIG. 8 depicts an alternative embodiment of the optical transmitter 102, where only one optical modulator is used to transmit the modulated optical pulse stream. In this embodiment, the optical transmitter 102 comprises a laser source 802, and optical modulator 804, an RZ data source 806, a bias control circuit 808, and control circuitry 810. The laser source 802 operates in a continuous wave (CW) mode to produce light at a predetermined transmission wavelength for a particular optical channel. Light from the laser source 802 is coupled to the optical modulator 804 via optical fiber 803. The optical modulator 804 can be an MZM, as described above with regard to FIG. 5.

RZ data source 806 is coupled to the optical modulator 804, which provides the data that is to be transmitted. The bias control circuit 808 provides the DC bias to the optical modulator 804. Control circuitry 810 controls the particular DC bias and RZ data signal generated by the bias control circuitry 808 and RZ data source 806, respectively. Once properly biased and driven, the carver modulator 504 produces an optical pulse stream (i.e., an RZ optical signal) having a pulse frequency in accordance with the bit rate of the system (e.g., 10 Gbit/s or twice the frequency of the RF driving signal). In particular, the control circuitry 810 varies the duty-cycle of the RZ data signal to generate optical pulses having variable widths. For example, an approximately 33% duty cycle RZ data signal produces output optical pulses having a pulse width of approximately 33 ps, and an approximately 44% duty cycle RZ data signal produces output pulses having a pulse width of approximately 44 ps.

As described above, the above embodiments of optical transmitters in FIGS. 5 and 8 are merely illustrative of that which can be employed by the present invention. Those skilled in the art will appreciate that the present invention may also be advantageously used to control the pulse widths of optical pulses supplied by other optical transmitters without departing from the spirit and scope of the present invention.

While the foregoing is directed to the preferred embodiment of the present invention, other and further embodiments of the invention may be devised without departing from the basic scope thereof, and the scope thereof is determined by the claims that follow.

The invention claimed is:

1. A method, comprising:
   for each of a plurality of optical channels in an optical transmission line, adjusting, in response to at least one control signal, the pulse width of optical pulses propagating therein in response to the path-average dispersion (PAD) thereof;
   wherein the pulse width of the optical pulses transmitted over at least one of the plurality of optical channels is adjusted to have a first value, and the pulse width of the optical pulses transmitted over a different at least one of the plurality of optical channels is adjusted to have a second value different than the first value, and wherein the step of adjusting the pulse width comprises:
   setting the pulse width to the first value when the PAD of an optical channel is in a first range; and
   setting the pulse width to the second value when the PAD of an optical channel is in a second range.

2. The method of claim 1, wherein the second pulse width value is greater than the first pulse width value, when the PAD in the second range is greater than the PAD in the first range.

3. The method of claim 2, wherein the first PAD range corresponds to shorter and longer carrier wavelengths of the optical pulses, and the second PAD range corresponds to middle carrier wavelengths of the optical pulses.

4. The method of claim 3, wherein the carrier wavelengths of the optical pulses comprise wavelengths ranging from 1500 nm to 1625 nm.

5. The method of claim 3 wherein the PAD for the plurality of optical channels as a function of the carrier wavelength of the optical pulses is a curve selected from the group consisting of a line, a parabola, and a higher-order polynomial.

6. The method of claim 2, wherein the first pulse width value is a nominal value and the second pulse width value is 30% to 60% larger than the first pulse width value.

7. The method of claim 6, wherein the first pulse width value is approximately 33 ps and the second pulse width value is approximately 44 ps.

8. The method of claim 1, wherein the PAD for each of the plurality of optical channels is in the range between 0.1 ps/nm/km and 0.4 ps/nm/km, and the pulse width of each of the optical pulses is in the range between 33 ps and 45 ps.

9. An apparatus, comprising:
   a plurality of optical modulators, each of the plurality of optical modulators transmitting optical pulses over a respective one of a plurality of optical channels having a particular path-average dispersion (PAD); and
   control circuitry, for adjusting the pulse widths of the optical pulses output from each of the plurality of optical modulators in response to the particular PAD of the optical channel associated therewith;
   wherein the pulse width of the optical pulses transmitted over at least one of the plurality of optical channels is adjusted to have a first value, and the pulse width of the optical pulses transmitted over a different at least one of the plurality of optical channels is adjusted to have a second value different than the first value, and wherein the control circuitry adjusts the pulse widths of the optical pulses output from each of the plurality of optical modulators such that the pulse width of the optical pulses is the first value when the PAD of the respective optical channel is in a first range, and the second value when the PAD of the respective optical channel is in a second range.

10. The apparatus of claim 9, wherein the control circuitry adjusts the pulse widths of the optical pulses output from each of the plurality of optical modulators by adjusting the amplitude of an RF driving signal input to each of the plurality of optical modulators.

11. The apparatus of claim 9, wherein the control circuitry adjusts the pulse widths of the optical pulses output from each of the plurality of optical modulators by adjusting the duty cycle of a return-to-zero (RZ) data signal input to each of the plurality of optical modulators.

12. The apparatus of claim 9, wherein the second pulse width value is greater than the first pulse width value, when the second range is greater than the first range.

13. The apparatus of claim 12, wherein the first pulse width value is a nominal value and the second pulse width value is 30% to 60% larger than the first pulse width value.

14. The apparatus of claim 13, wherein the first pulse width value is approximately 33 ps and the second pulse width value is approximately 44 ps.

15. The apparatus of claim 14, wherein the first pulse width value is a nominal value and the second pulse width value is 30% to 60% larger than the first pulse width value.

16. The apparatus of claim 9, wherein the first PAD range corresponds to shorter and longer carrier wavelengths of the optical channels, and the second PAD range corresponds to middle carrier wavelengths of the optical channels.

17. The apparatus of claim 9 wherein the PAD for each of the plurality of optical channels is in the range between 0.1 ps/nm/km and 0.4 ps/nm/km, and the pulse width of each of the optical pulses is in the range between 33 ps and 45 ps.

18. In a lightwave communication system having a plurality of network elements for supplying an optical signal adapted for transmission in an optical fiber path, an apparatus for transmitting optical pulses comprising:
   means for transmitting optical pulses over a plurality of optical channels; and
   means for adjusting, in response to at least one control signal, the pulse width of the optical pulses propagating in each of the plurality of optical channels, in response to the path-average dispersion (PAD) of the respective optical channel;
   wherein the pulse width of the optical pulses transmitted over at least one of the plurality of optical channels is adjusted to have a first value, and the pulse width of the optical pulses transmitted over a different at least one of the plurality of optical channels is adjusted to have a second value different than the first value, and wherein the means for adjusting the pulse width comprises:
   means for setting the pulse width to the first value when the PAD of an optical channel is in a first range; and
   means for setting the pulse width to the second value when the PAD of an optical channel is in a second range.

19. The apparatus of claim 18, wherein the PAD for each of the plurality of optical channels is in the range between 0.1 ps/nm/km and 0.4 ps/nm/km, and the pulse width of each of the optical pulses is in the range between 33 ps and 45 ps.

* * * * *